United States Patent
Salter et al.

(10) Patent No.: US 10,059,238 B1
(45) Date of Patent: Aug. 28, 2018

(54) VEHICLE SEATING ASSEMBLY

(71) Applicant: Ford Global Technologies, LLC, Dearborn, MI (US)

(72) Inventors: Stuart C. Salter, White Lake, MI (US); Annette Lynn Huebner, White Lake, MI (US); James J. Surman, Clinton Township, MI (US); Paul Kenneth Dellock, Northville, MI (US); Joshua Greiner, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/607,761

(22) Filed: May 30, 2017

(51) Int. Cl.
| | | |
|---|---|---|
| *B60Q 1/00* | (2006.01) |
| *B60Q 1/26* | (2006.01) |
| *B60N 2/90* | (2018.01) |
| *B60Q 9/00* | (2006.01) |
| *G03B 21/14* | (2006.01) |

(52) U.S. Cl.
CPC ............. *B60N 2/90* (2018.02); *B60Q 9/00* (2013.01); *G03B 21/14* (2013.01)

(58) Field of Classification Search
CPC ...... B60N 2/90; B60N 2/91; B60N 2002/905; B60Q 9/00; G03B 21/14–21/2093; G03B 21/54–21/625
USPC .................................................. 362/487–488
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,076,524 A * | 12/1991 | Reh .................... | B60N 2/79 |
| | | | 248/296.1 |
| 5,123,707 A | 6/1992 | Wurzell | |
| 5,434,013 A | 7/1995 | Fernandez | |
| 5,709,453 A | 1/1998 | Krent et al. | |
| 5,839,718 A | 11/1998 | Hase et al. | |
| 6,031,511 A | 2/2000 | DeLuca et al. | |
| 6,117,362 A | 9/2000 | Yen et al. | |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP

(57) ABSTRACT

A seating assembly is provided herein. The seating assembly includes a partition disposed between first and second seats. The partition includes a panel movable between a stowed position and a deployed position along a track assembly. A first lamp is configured to project a first image onto the panel.

20 Claims, 14 Drawing Sheets

(56) References Cited

U.S. PATENT DOCUMENTS

| | | |
|---|---|---|
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,585,022 B2 | 9/2009 | Achilles et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,272,674 B2 | 9/2012 | Vance |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,714,655 B2 | 5/2014 | Cahall et al. |
| 8,720,991 B2 | 5/2014 | Macleod et al. |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,434,282 B2 | 9/2016 | Kronenberger |
| 9,568,659 B2 | 2/2017 | Verger et al. |
| 9,616,812 B2 | 4/2017 | Sawayanagi |
| 9,823,469 B2 * | 11/2017 | Crane ................ G02B 27/0101 |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2009/0268164 A1 * | 10/2009 | Bowden ................ B60K 35/00 353/13 |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| NO | 2014161927 A1 | 10/2014 |
| WO | 2006047306 A1 | 5/2006 |
| WO | 2014068440 A1 | 5/2014 |

* cited by examiner

US 10,059,238 B1

VEHICLE SEATING ASSEMBLY

FIELD OF THE INVENTION

The present disclosure generally relates to interior vehicle panels and, more particularly, to interior vehicle panels that may be illuminated in response to various inputs.

BACKGROUND OF THE INVENTION

More than one passenger may occupy a rear seat of a vehicle. For some vehicles, it may be desirable to have a separating panel between the occupants.

SUMMARY OF THE INVENTION

According to one aspect of the present disclosure, a seating assembly is disclosed. The seating assembly includes a partition disposed between first and second seats. The partition includes a panel that is movable between a stowed position and a deployed position along a track assembly. A first lamp is configured to project a first image onto the panel.

According to another aspect of the present disclosure, a seating assembly is disclosed. The seating assembly includes a movable partition disposed between first and second seats. The movable partition includes a panel. A projector lamp is operably coupled with the panel. The projector lamp creates a first image as an occupant enters a vehicle and a second image as the occupant exits the vehicle.

According to yet another aspect of the present disclosure, a seating assembly is disclosed. The seating assembly includes a partition disposed between first and second seats. The partition includes a panel that is movable between a stowed position and a deployed position. First and second bins are respectively disposed proximate the first and second seats. A housing separates the first and second bins. A lamp is configured to create an image on the panel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
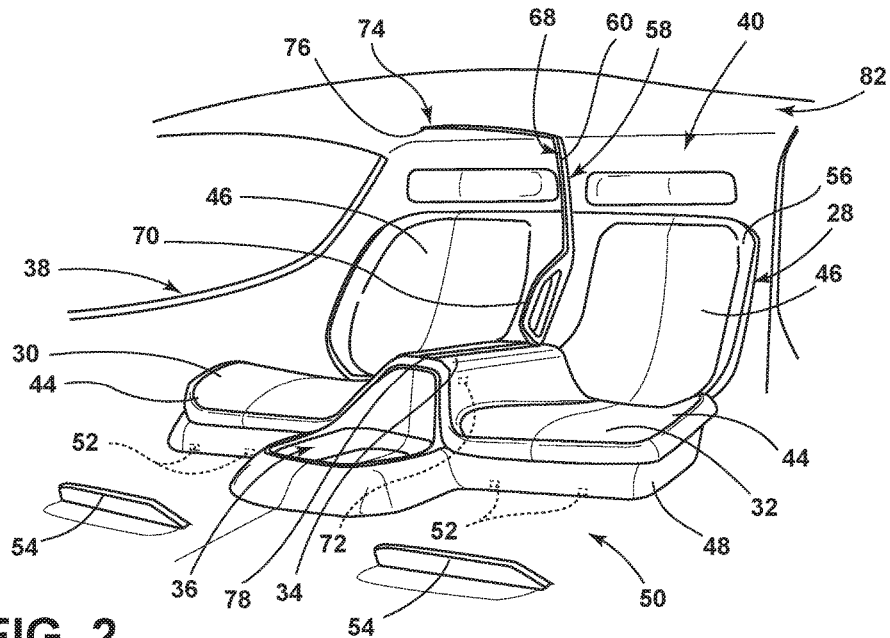
FIG. 2 is a front side perspective view of a seating assembly incorporating a partition between a pair of seats, the partition having a panel disposed in a stowed position, according to some examples.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a partition for a seating assembly. The seating assembly may be disposed within a vehicle compartment. The partition may employ one or more phosphorescent and/or luminescent structures to luminesce in response to predefined events. The one or more luminescent structures may be configured to convert excitation light received from an associated light source and re-emit the light at a different wavelength generally found in the visible spectrum. The partition may additionally, and/or alternatively, include a projection lamp for displaying images.

Figure 1A:
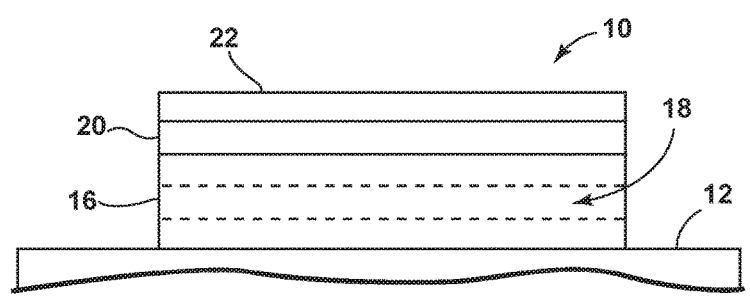
FIG. 1A is a side view of a luminescent structure rendered as a coating, according to some examples.
Figure 1B:
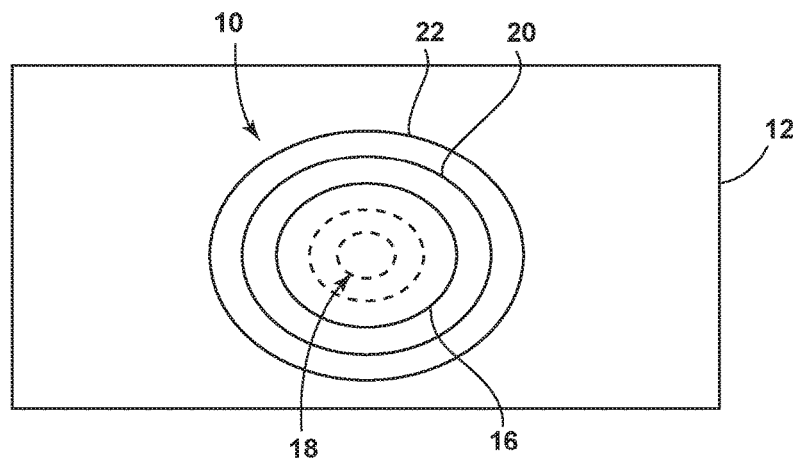
FIG. 1B is a top view of a luminescent structure rendered as a discrete particle, according to some examples.
Figure 1C:
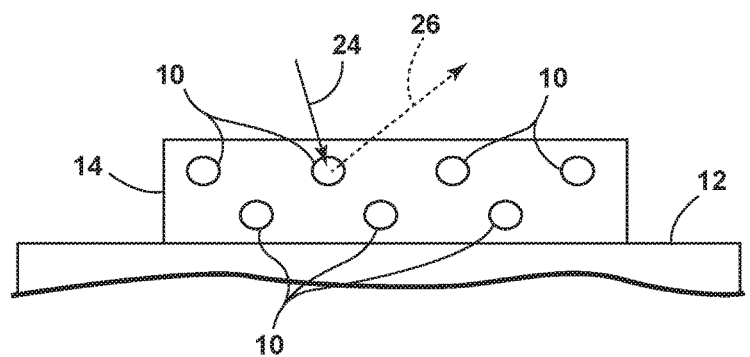
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an excitation light 24 of a specific wavelength, thereby causing the light to undergo a conversion process. Under the principle of down conversion, the excitation light 24 is converted into a longer-wavelength, converted light 26 that is outputted from the luminescent structure 10. Conversely, under the principle of up conversion, the excitation light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to various examples, a Ce$^{3+}$ garnet may be utilized, which has a peak excitation spectrum that may reside in a shorter wavelength range than that of conventional YAG:Ce-type phosphors. Accordingly, Ce$^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue excitation light 24 emitted from the light sources 120a, 120b. According to various examples, a ZnS:Ag phosphor may be used to create a blue-converted light 26. A ZnS:Cu phosphor may be utilized to create a yellowish-green converted light 26. A Y$_2$O$_2$S:Eu phosphor may be used to create red converted light 26. Moreover, the aforementioned phosphorescent materials may be combined to form a wide range of colors, including white light. It will be understood that any short-persistence luminescent material known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the excitation light 24. The excitation light 24 may be emitted from any excitation source (e.g., any natural light source, such as the sun, and/or any artificial light sources 120a, 120b). The long-persistence luminescent material 18 may be defined as having a long decay time due to its ability to store the excitation light 24 and release the converted light 26 gradually, for a period of several minutes or hours, once the excitation light 24 is no longer present.

The long-persistence luminescent material 18, according to various examples, may be operable to emit light at or above an intensity of 0.32 mcd/m$^2$ after a period of 10 minutes. Additionally, the long-persistence luminescent material 18 may be operable to emit light above or at an intensity of 0.32 mcd/m$^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any light sources 120a, 120b that emit the excitation light 24, including, but not limited to, natural light sources (e.g., the sun) and/or any artificial light sources 120a, 120b. The periodic absorption of the excitation light 24 from any excitation source may provide for a substantially sustained charge of the long-persistence luminescent material 18 to provide for consistent passive illumination. In various examples, a light sensor may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example, doped di-silicates, or any other compound that is capable of emitting light for a period of time once the excitation light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the excitation light 24 of a particular wavelength, the luminescent structure 10 may emit any color light (e.g., blue or red) therefrom at any desired brightness. According to various examples, a blue emitting phosphorescent material may have the structure Li$_2$ZnGeO$_4$ and may be prepared by a high-temperature solid-state reaction method or through any other practicable method and/or process. The afterglow may last for a duration of 2-8 hours and may originate from the excitation light 24 and d-d transitions of Mn2+ ions.

According to an alternate non-limiting exemplary example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Figure 3:
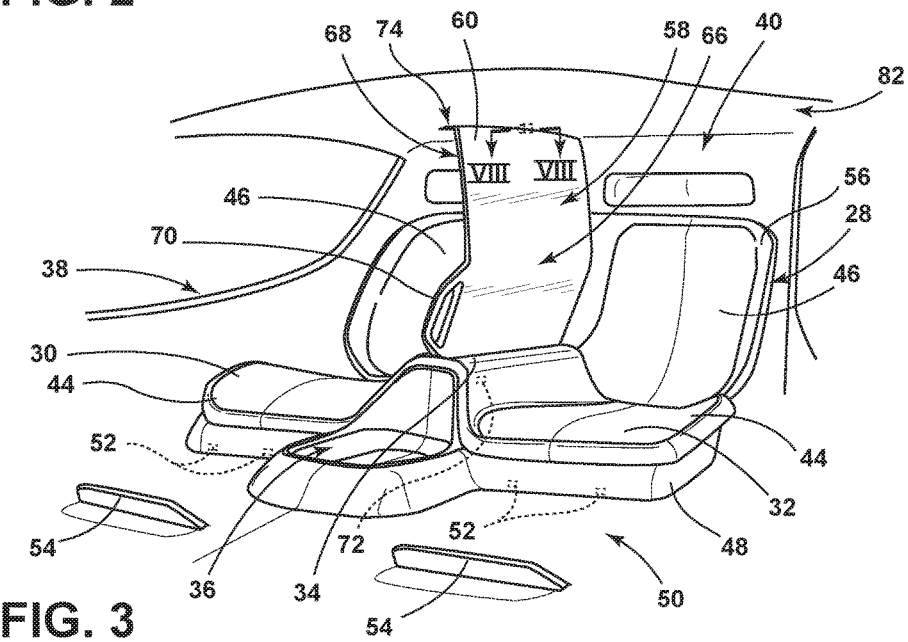
FIG. 3 is a side perspective view of the seating assembly having the panel disposed in a deployed position, according to some examples.

Referring to FIGS. 2 and 3, a seating assembly 28 includes two adjacently disposed seats 30, 32 that may have a structure, such as a passenger console 34, disposed between the two seats 30, 32. The passenger console 34 can include various storage compartments such as cup holders and/or a storage container 36. The seating assembly 28 may be disposed within a vehicle compartment 38 and may form a rear seating assembly 28 of the vehicle compartment 38. The seating assembly 28 provided herein may be additionally and/or alternatively disposed in any other practicable location within a passenger vehicle 40 or any other type of vehicle, without departing from the scope of the present disclosure.

Figure 5:
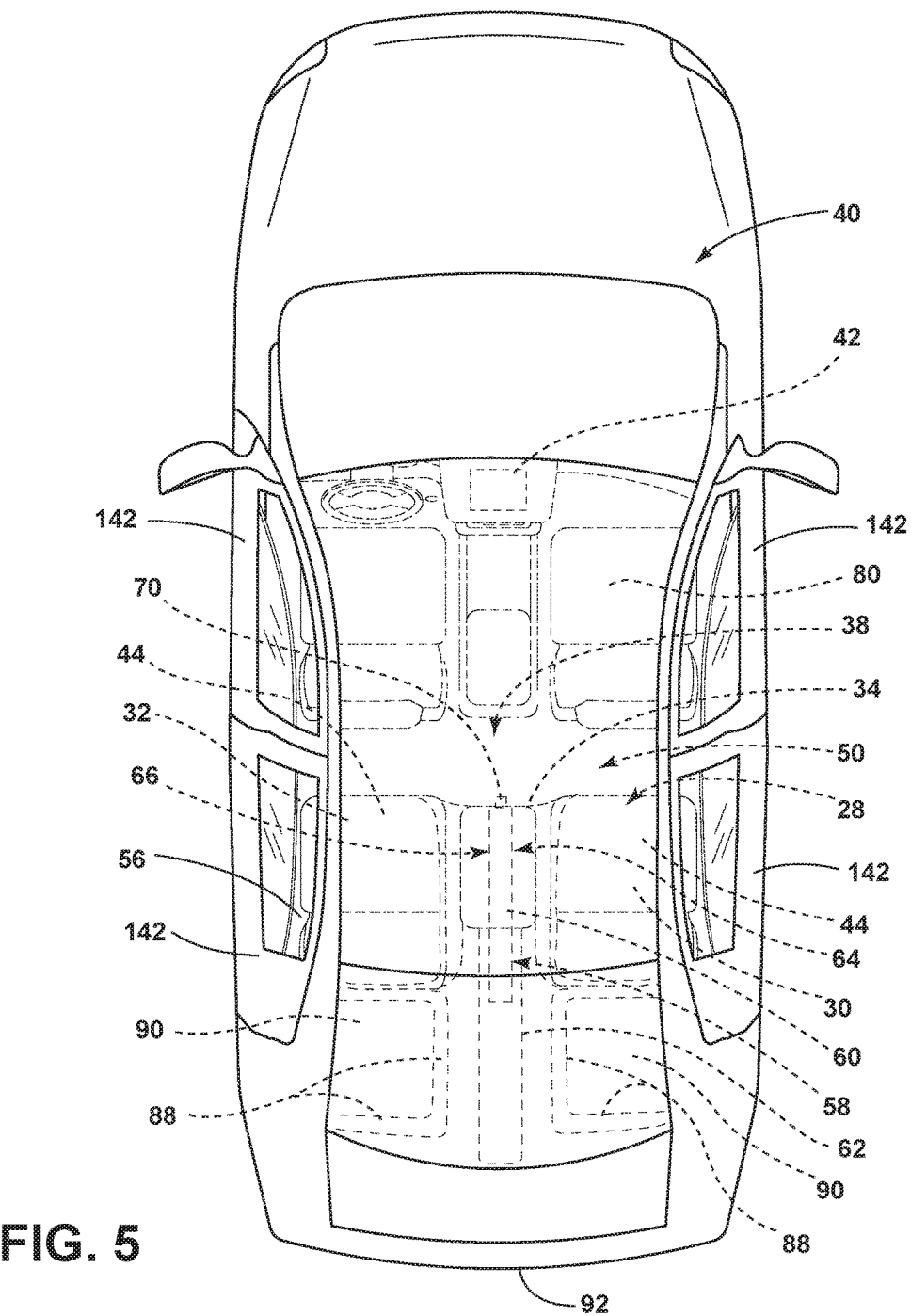
FIG. 5 is a top plan view of a vehicle having the seating assembly therein, according to some examples.

With further reference to FIGS. 2 and 3, the vehicle 40 may be a manually operated vehicle (i.e. using a human driver) or may be autonomously driven by an onboard computer 42 (FIG. 5). Additionally, or alternatively, the vehicle 40 may be remotely controlled (e.g., via an operator located in a different location). Moreover, the vehicle 40 may be utilized for personal and/or commercial purposes, such as for ride-providing (chauffeuring) services and/or ride-sharing services.

Referring still to FIGS. 2 and 3, each seat includes a seat bottom 44 coupled with a seatback 46. The seat bottom 44 may be slidably coupled with a floor 50 of the vehicle 40 and/or a seat carrier 48 about a track assembly 52. The track assembly 52 is configured to allow the vehicle seating assembly 28 to be adjusted in a forward and a rearward direction relative to the vehicle 40. It is understood that the seat 30, 32 may not include the track assembly 52 and may be otherwise movably attached to the vehicle 40, or alternatively, may be fixedly coupled with the floor 50 and/or the seat carrier 48 of the vehicle 40. Further, it will be appreciated that the partition 58 described herein may be utilized on any portion of any seating assembly 28 without departing from the teachings provided herein. A footrest 54 may also protrude from the vehicle floor 50, or otherwise be disposed, forwardly of the seats.

The seatback 46 of the seating assembly 28 may be coupled to a body portion of the vehicle 40 and extend upward from the seat 30, 32. The seatback 46 also includes a cushion and an upholstery material disposed over the cushion substantially enclosing the seatback 46. A headrest may be removably and adjustably coupled with the upper portion of the seatback 46 and may be substantially centered thereon. Accordingly, an attachment structure for the headrest may include the seatback 46 and more specifically, the upper portion of the seatback 46.

With further reference to FIGS. 2 and 3, the partition 58 may be disposed between the two seats of the seating assembly 28. The partition 58 includes a panel 60 that is movable between a stowed position in which the panel 60 is disposed within a housing 62 (FIG. 4), as illustrated in FIG. 2, and/or otherwise removed from separating passengers disposed within the two seats 30, 32. The panel 60 may be moved to a deployed position, as illustrated in FIG. 3, in which the partition 58 separates the two vehicle seats 30, 32 providing privacy to an occupant disposed laterally adjacent to one side of the panel 60.

The panel 60 may be configured from any practicable material, which may be pliable or rigid. The panel 60 may include two opposing side surfaces 64 (FIG. 4), 66 that may face opposing lateral sides of the vehicle 40. A forward surface 68 of the panel 60 may define a thickness of the panel 60. The panel 60 may be configured as a single component and/or a plurality of materials that are attached to one another. According to various examples, the panel 60 may be configured from an opaque material.

A handle 70 may be coupled, or integrally formed with, the panel 60. The handle 70 may be used to move the panel 60 between the stowed and deployed positions. Additionally, and/or alternatively, a switch 72 may be disposed on the panel 60 and/or within the vehicle compartment 38 and operably coupled with an electronic device 180. The electronic device 180 is configured to move the panel 60 between the stowed and deployed positions.

Figure 4:
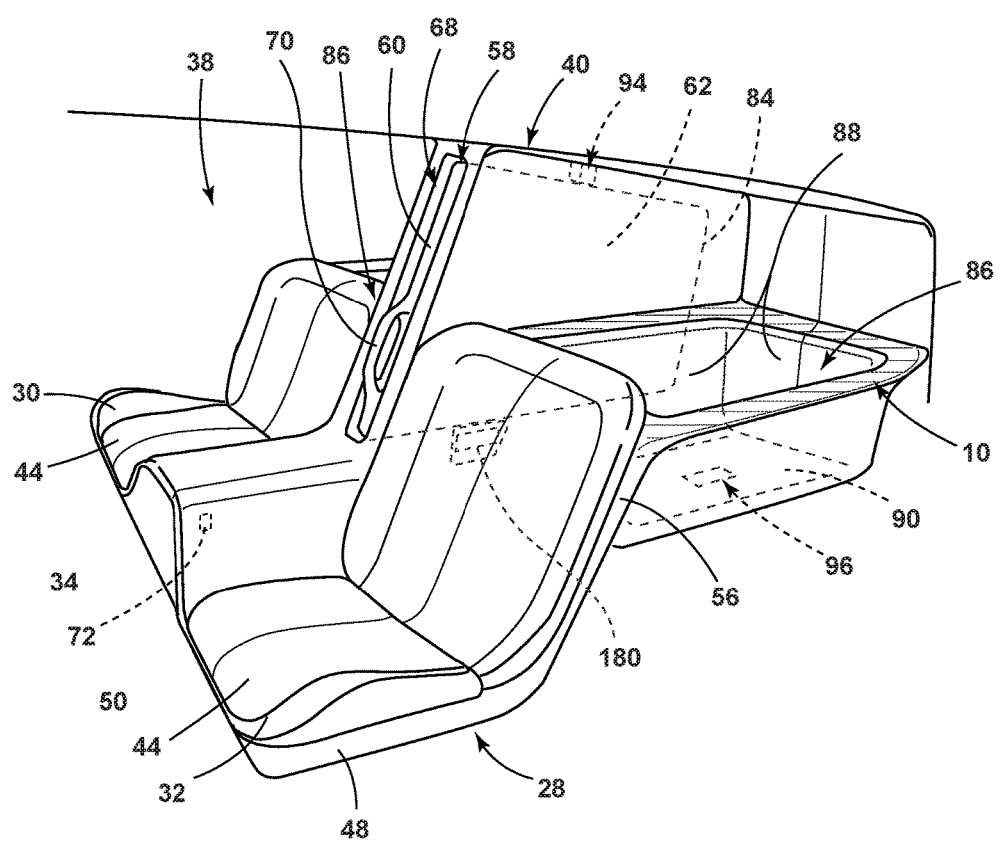
FIG. 4 is a side perspective view of the seating assembly and partition, the partition including a housing disposed between a pair of bins, according to some examples.

According to various examples, the panel 60 moves between the stowed and deployed position along a track system 74. The track system 74 may include a top rail 76 and may be coupled to a structure within the vehicle 40, such as a roof structure 80 (FIG. 5) of the vehicle 40, the headliner 82, and/or the housing 62 may extend vehicle forward and the track system 74 may be supported by the housing 62, as illustrated in FIG. 4. The panel 60 may be suspended from the top rail 76. In some examples, a bottom rail 78 may be disposed below the top rail 76 and maintain a lower portion of the panel 60. Through usage of the top rail 76 and the bottom rail 78, the panel 60 may maintain a vertical orientation, or any other predefined orientation, as the vehicle 40 is in motion. The track system 74 may also include latches, stops, and/or any other type of device that may maintain the panel 60 in a desired position while the vehicle 40 is in motion. It will be appreciated, however, that any number of rails may be utilized within the track system 74. Moreover, the track system 74 may include any type of assembly known in the art to move the panel 60 between stowed and deployed positions, including, but not limited to, gears, ratchet systems, electronically driven systems, etc.

Referring to FIGS. 4 and 5, the housing 62 may be integrally formed with the seating assembly 28, or later attached thereto. The housing 62 defines a cavity 84 upon which the panel 60 may be disposed in when the panel 60 is in the stowed position. The housing 62 may be manufactured from any practicable material, such as a polymeric material. One or more storage bins 86 may be disposed proximate the seating assembly 28, or be integrally formed with the seating assembly 28. The housing 62 may separate the storage bins 86.

The storage bins 86 are provided to hold items of the occupants. The storage bins 86 may be fabricated from a rigid plastic, or any other practicable material. Each storage bin 86 has a plurality of sidewalls 88 and a bottom 90. The storage bins 86 may be accessible by rotating the seatback 46 (FIGS. 2 and 3) vehicle forward and/or through a trunk lid 92, or tailgate, of the vehicle 40. In some examples, the seat carrier 48 defines a void and a removable bin 86 may be disposed within the carrier. In other examples, the bin 86 may be fixedly attached and/or integrally formed with the carrier and/or housing 62. The luminescent structure 10 may be disposed on a rim, or any other portion of the seating assembly 28, to provide illumination to the bin 86. The luminescent structure 10 may luminescent in response to receiving environmental light that is transmitted through a window of the vehicle 40 and/or in response to receiving excitation light 24 from a light source 94 within the vehicle 40. In some examples, the light source 94 may be disposed on the housing 62.

According to various examples, a bin sensor 96 may be operably coupled with the bin 86. The sensor may be configured to detect the presence of an object within the bin 86. The sensor may be configured as a weight sensor, a proximity sensor, an optical sensor, and/or any other practicable type of sensor. If an object is detected within the bin 86, the vehicle 40 may provide an alert reminding an occupant of the vehicle 40 to remove the object upon completion of a vehicle trip.

Figure 7:
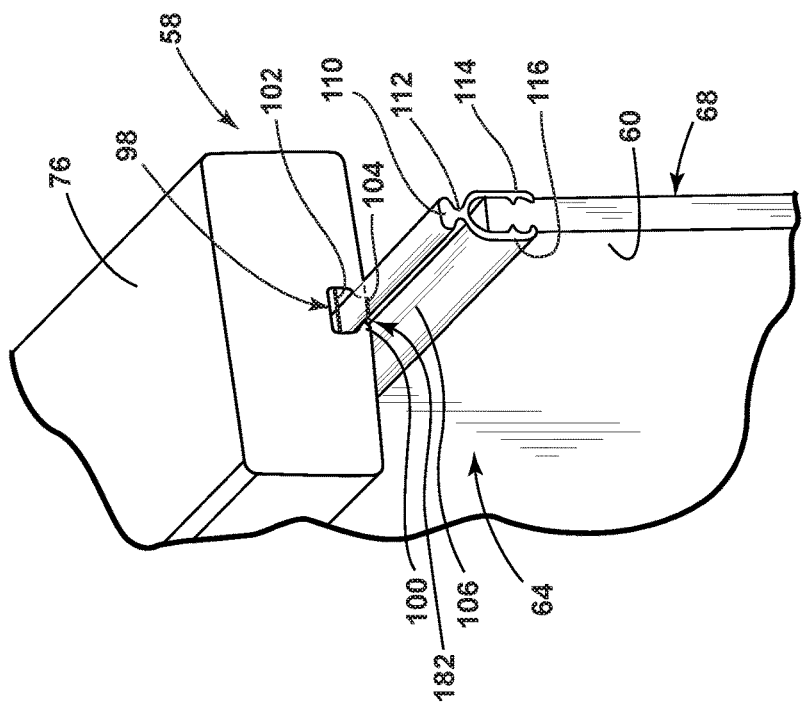
FIG. 7 is a partial front perspective view of a second lateral surface of the panel between the stowed and deployed positions, according to some examples.
Figure 6:
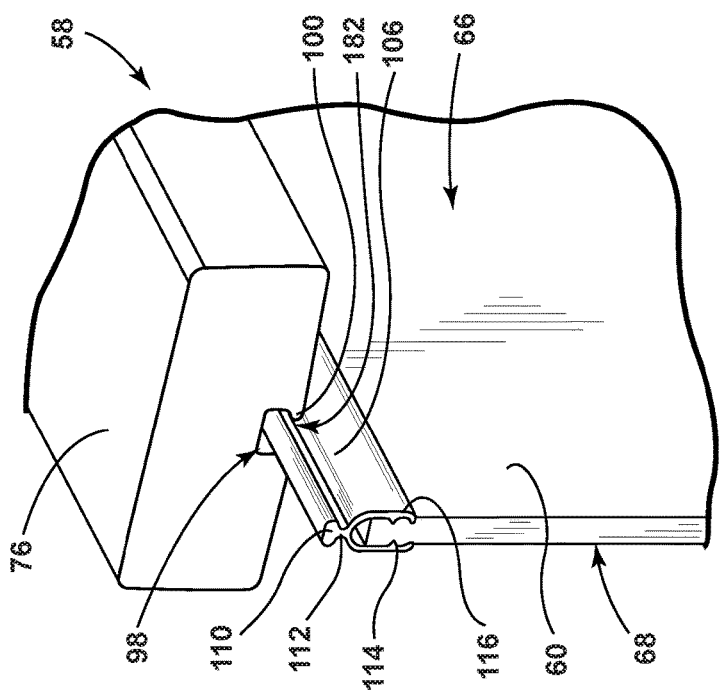
FIG. 6 is a partial front perspective view of a first lateral surface of the panel and a track system operably coupled with the panel, according to some examples.

Referring to FIGS. 6 and 7, the track system 74 includes the top rail 76, which is an exemplary construction that can be used in the systems described herein; however, any other construction for track system 74 can be used as well. The top rail 76 defines an elongate opening 98 along the bottom of the rail and a track 100 along the side of the elongate opening 98. It should be understood that top rail 76 can define different numbers of channels and tracks 100 therein, or even more than one channel, depending on the desired final configuration of the track system 74. Various combinations and arrangements of traversing rails within the channels can be used so that desired effects can be achieved.

The elongate opening 98 has a cavity 84 having a first width 102 and a slot opening 182 having a second width 104. The second width 104 is less than the first width 102, so that a panel hanger 106 that is coupled to the panel 60 and/or integrally formed with the panel 60 is retained in the cavity 84 without falling through slot opening 182. According to various examples, a forward portion of the panel 60 may protrude forwardly of the rail. Likewise, a vehicle rearward portion of the panel 60 may protrude from a rear end of the track system 74. An end cap may be provided at one, or both ends, of the top rail 76 to prevent the panel hanger 106 from sliding out either of the ends unintentionally. The panel hanger 106 may have a corresponding stop that interacts with the end cap to prevent movement of the panel 60 beyond the end cap.

The panel 60 may be attached to the panel hanger 106 by any structure known in the art, for example and not limitation, adhesives, welding, hook-and-loop patches, stapling, or the like, and may include combinations of fastening techniques. Additionally, and/or alternatively, the panel hanger 106 may be integrally formed with the panel 60. The panel hanger 106 can be made of plastic, such as, for example, PVC in an extrusion molding process, and is relatively inexpensive to manufacture and supply.

The panel hanger 106 may include a head 110 and a neck 112 extending the length of hanger 106 with first and second arms 114, 116 depending from the neck 112. The width of the head 110 is wider than the width of the slot opening 182 such that the head 110 is retained on the track 100. The first and second arms 114, 116 also extend the length of the hanger 106 and extend downwardly. The fasteners may be disposed through the arms 114, 116 and into the panel 60 in some examples. Alternatively, the arms 114, 116 may compressively maintain the panel 60 therebetween. In various examples, the hanger 106 may not have arms 114, 116.

Figure 8:
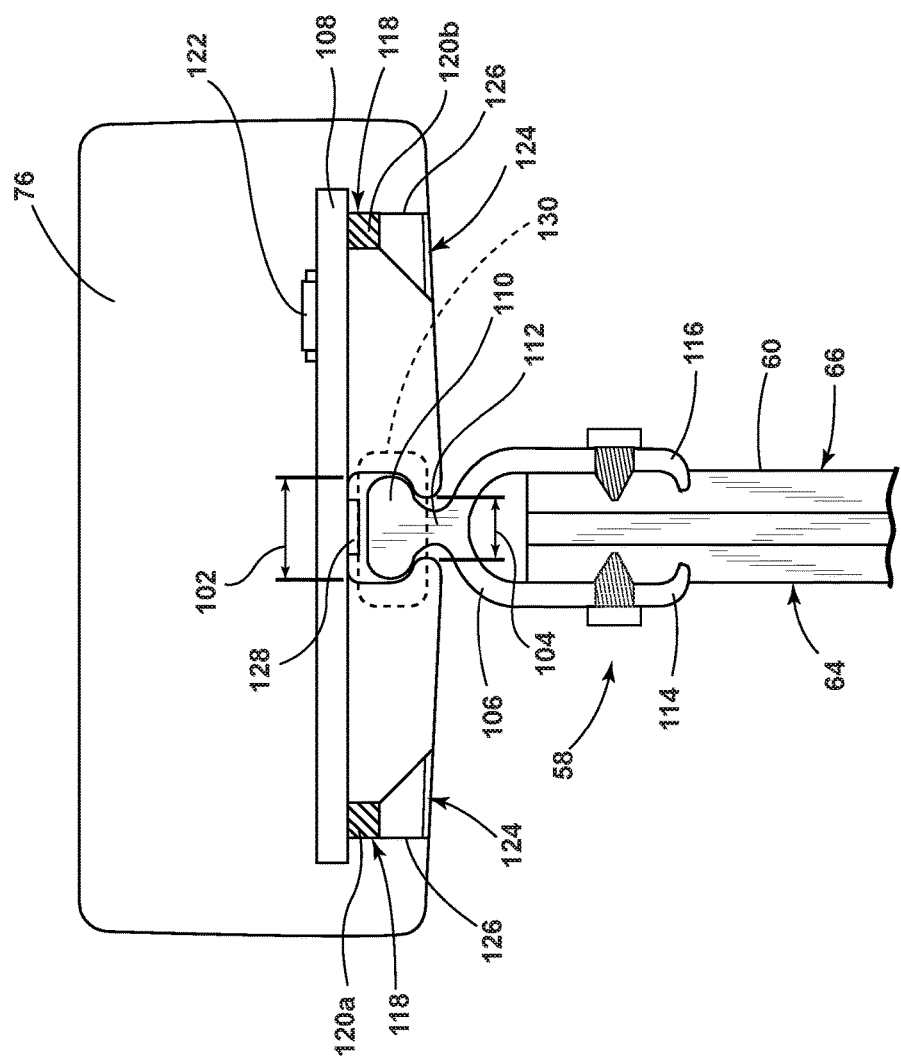
FIG. 8 is a cross-sectional view of the panel and track system taken along the line VIII-VIII of FIG. 3, according to some examples.

Referring to FIG. 8, the track system 74 may include a lamp 118 that is coupled to a circuit board 108. The circuit board 108 may be secured to and/or within the track system 74. The lamp 118 may include one or more light sources 120a, 120b that may be configured to emit visible and/or non-visible light, such as blue light, ultraviolet (UV) light, infrared light, and/or violet light towards an exterior surface 64, 66 of the panel 60 when the panel 60 is in the deployed position. In some examples, two opposing lateral surfaces 64, 66 of the panel 60 may have a light source 120a, 120b respectively coupled therewith. The light sources 120a, 120b may include any form of light source 120a 120b. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the lamp 118. Further, various types of LEDs are suitable for use as the light sources 120a, 120b including, but not limited to, top-emitting LEDs, side-emitting LEDs, and others.

The circuit board 108 may be configured as a printed circuit board (PCB) that is operably coupled with a controller 122 including control circuitry including LED drive circuitry for controlling activation and deactivation of the light sources 120a, 120b. The controller 122 may be disposed in the vehicle 40 and/or within the partition 58. The circuit board 108 may be configured in any fashion known in the art including, but not limited to, any flexible PCB and/or rigid PCB. The controller 122 may activate the light sources 120a, 120b based on a plurality of inputs and may modify the intensity of the emitted wavelengths of excitation light 24 by pulse-width modulation, current control, and/or any other method known in the art. In various examples, the controller 122 may be configured to adjust a color and/or intensity of the excitation light 24 by sending control signals to adjust an intensity or energy output level of the light sources 120a, 120b. According to various examples, the controller 122 may increase the intensity of excitation light 24 emitted from any of the light sources 120a, 120b up to five times steady state. According to various examples, multicolored light sources 120a, 120b, such as Red, Green, and Blue (RGB) LEDs that employ red, green, and blue LED packaging may be used to generate various desired colors of light outputs from a single light source 120a, according to known light color mixing techniques.

With further reference to FIG. 8, the lamp 118 includes a lens 124. To disperse the light emitted from the light source 120a, 120b, a diffusing optic 126 can be disposed between the light source 120a, 120b and the lens 124 to provide for a more even light distribution across the lens 124 when the light source 120a, 120b is activated.

In the illustrated example, a position sensor, shown and described herein as capacitive sensor 128, can be provided within the cavity 84 or in close proximity to the panel hanger 106 and/or the panel 60. The capacitive sensor 128 provides a sense activation field 130 that encompasses a portion of the hanger 106 and/or the panel 60 and can detect capacitive changes resulting from a conductor, such as the hanger 106, being within the sense activation field 130 of the capacitive sensor 128 (e.g. within a rear portion of the cavity 84). The capacitive sensor 128 may be positioned in a predefined position such that the sensor may detect whether the partition 58 is in the stowed position or the deployed position. In some examples, if the capacitive change meets or exceeds a predetermined threshold level indicating that the partition 58 has moved to the deployed position, the lamp 118 can be prompted to activate accordingly. While the proximity sensor is shown and described herein as capacitive sensor 128, it should be appreciated that additional or alternative types of proximity sensors can be used for detecting various other signal changes, such as, but not limited to, inductive sensors, optical sensors, temperature sensors, resistive sensors, the like, or a combination thereof. Moreover, any other position-detecting device may be utilized in conjunction with, or in lieu of, the proximity sensor.

Figure 9:
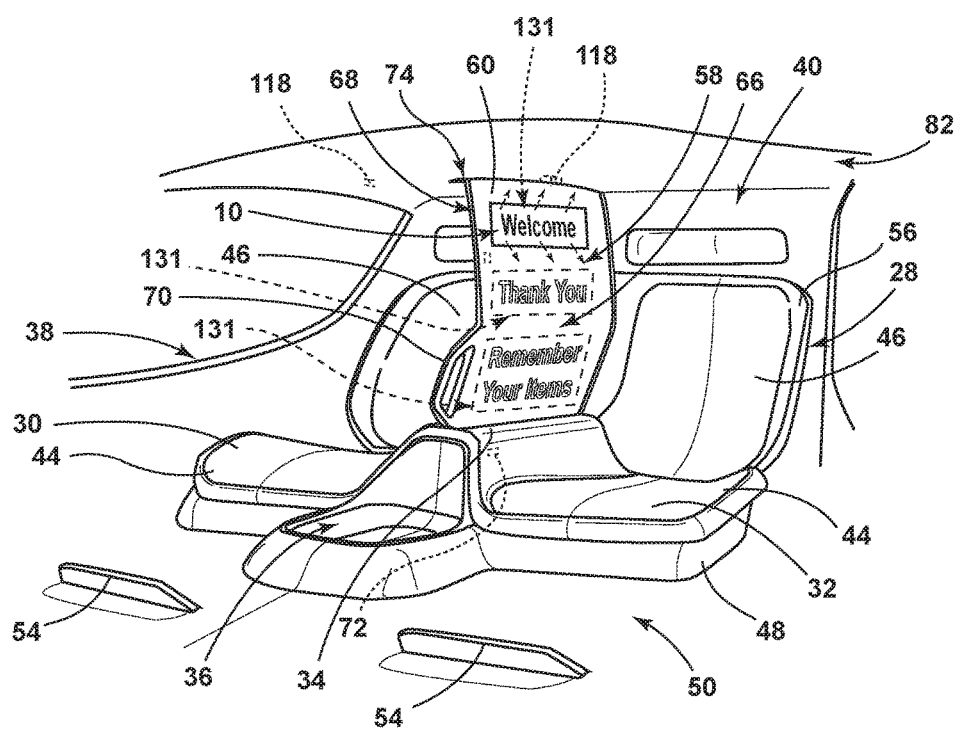
FIG. 9 is a side perspective view of the seating assembly having a plurality of independently illuminable indicia on the panel, according to some examples.

With reference to FIG. 9, the luminescent structure 10 may be disposed on and/or within the partition 58. In operation, the luminescent structure 10 may include a plurality of luminescent materials 18 (FIG. 1A) therein that luminesce in response to receiving light of a specific wavelength spectrum. According to various examples, the luminescent structure 10 discussed herein is substantially Lambertian; that is, the apparent brightness of the luminescent structure 10 is substantially constant regardless of an observer's angle of view. As described herein, the color of the converted light 26 may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending the first wavelength with the second wavelength.

The panel 60 may include a plurality of luminescent structures 10 that define messages 131 and/or indicia thereon that may be independently illuminable by the one or more light sources 120a, 120b. For example, the partition 58 may have a first message that welcomes occupants into the vehicle 40. A second message may thank an occupant for riding in the vehicle 40 as the vehicle 40 comes to a stop and a door 142 (FIG. 5) is opened and/or as the vehicle 40 approaches a predefined drop-off location. Further, the messages 131 may remind passengers of the vehicle 40 to retrieve items stored in the bins 86 disposed around the vehicle 40. The message reminding passengers to remove their belongings may illuminate once a sensor detects an object has been placed within one of the bins 86. It will be appreciated that each side surface 64, 66 of the partition 58 may include unique and independently illuminable messages 131. Accordingly, each passenger may receive independent messages 131 based on settings and preferences within their respective seat 30, 32 of the vehicle compartment 38.

Figure 10:
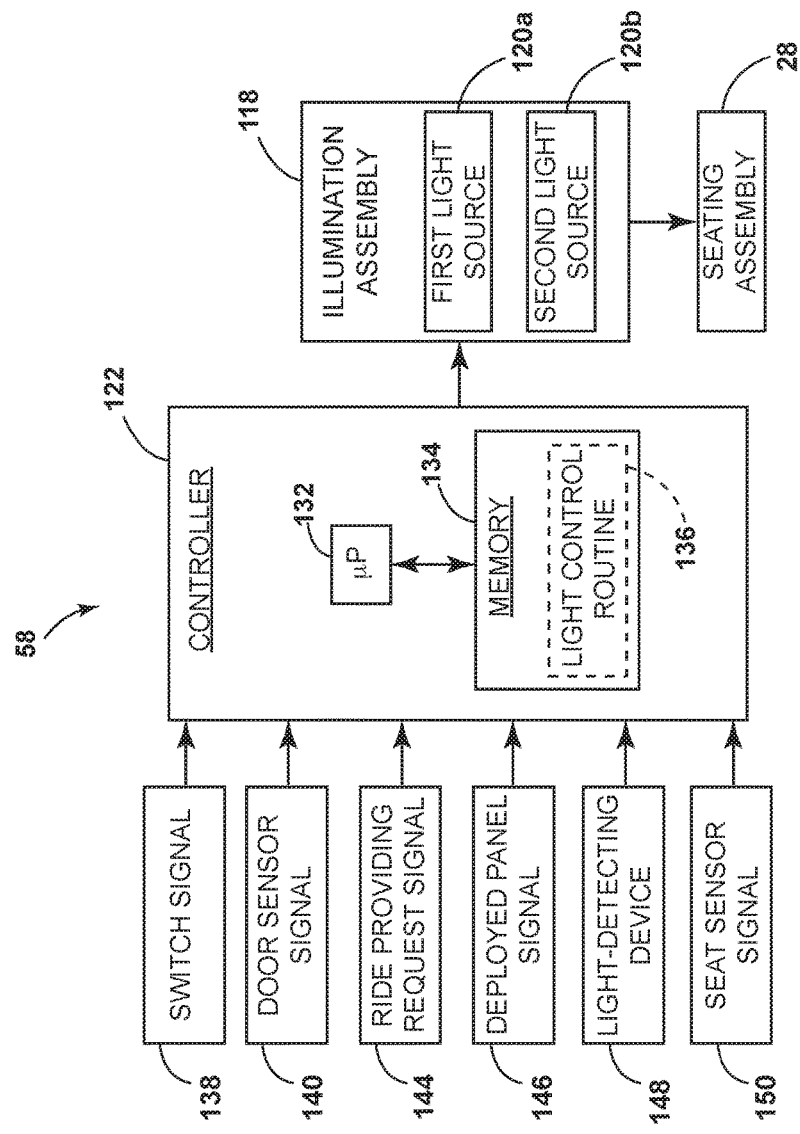
FIG. 10 is a block diagram illustrating controls for activating a lamp that is operably coupled with the panel, according to some examples.

With reference to FIG. 10, the lamp 118 may include a pair of light sources 120a, 120b that are configured to illuminate opposing sides of the panel 60 and are controlled by a controller 122 in response to various inputs. The controller 122 is shown including control circuitry in the form of a microprocessor 132 and memory 134. A light control routine 136 is shown stored in memory 134 and executable by the microprocessor 132. The microprocessor 132 or other control circuitry processes the various inputs and the light control routine 136 generates outputs to control the light sources 120a, 120b within the lamp 118. It should be appreciated that other analog and/or digital circuitry may be employed to process the various inputs and routines to activate the lamp 118.

The inputs to controller 122 include a switch signal 138. The switch signal 138 may activate or deactivate the light sources 120a, 120b based on the toggling of a switch 72 within the vehicle 40 by an occupant. The switch 72 may be disposed on the handle 70 or any other portion of the partition 58. Additionally, and/or alternatively, the switch 72 may be disposed within any other practicable location of the vehicle compartment 38.

The inputs to controller 122 may also include a door state signal 140. A door sensor may be configured to determine whether a door 142 (FIG. 5) has been opened and/or closed. In some instances, the door sensor may include a switch or proximity sensor such as a Hall-effect sensor. The door sensor may be configured to output a door state signal 140. When the door 142 is closed, the door state signal 140 may indicate a closed state (i.e., the door 142 is closed). When the door 142 is open, the door state signal 140 may indicate an open state (i.e., the door 142 is open). The vehicle 40 may include any number of door sensors. At least one door sensor may be disposed on each door 142. In addition, door sensors may be located on a hood, the trunk lid 92, a lift gate, and possibly other locations throughout the vehicle 40 such as lockable storage compartments.

The controller 122 may also accept a ride-providing signal 144 indicative of an occupant entering the vehicle 40 and/or the end of a trip for a ride providing service. Accordingly, the lamp 118 may illuminate in conjunction with the entering and/or exiting of an occupant. Further, the controller 122 may accept a deployed panel signal 146, which may be provided by the proximity sensor. In some examples, the light sources 120a, 120b may maintain deactivated state while the panel 60 is in the stowed position and activate as the panel 60 is disposed in the deployed state. Additionally, and/or alternatively, the light sources 120a, 120b may be used as an overhead component lamp while the partition 58 is in the stowed position.

With further reference to FIG. 10, the controller 122 may accept a signal 148 from a light-detecting device of the vehicle 40. The light-detecting device senses the environmental lighting conditions, such as whether the vehicle 40 is in day-like conditions (i.e., higher light level conditions) and/or whether the vehicle 40 is in night-like conditions (i.e., lower light level conditions). The light-detecting device can be of any suitable type and can detect the day-like and night-like conditions in any suitable fashion. For instance, in some examples, the light-detecting device includes a light sensor that detects the amount of light (e.g., solar radiation) affecting the vehicle 40 for determining whether day-like or night-like conditions exist. According to some examples, the colors of light and/or intensities of light emitted from the lamp 118 may be varied based on the sensed conditions. For example, the light sources 120a, 120b may emit light of high intensity in any color during day-like conditions. Additionally, and/or alternatively, the light sources 120a, 120b may be configured to emit light of the first color and low intensity in the second color in night-like conditions while the vehicle 40 is in motion. Once the vehicle 40 is in a parked state, the lamp 118 may emit light at a high intensity in the second color.

The controller 122 may also accept a signal 150 from a seat sensor. The seat sensor, which includes, but is not limited to, any type of proximity sensor, seat airbag sensor, pressure sensor, etc., may be utilized for activating the lamp 118. For example, the lamp 118 may be activated when an occupant is disposed on the seating assembly 28 and is deactivated when the seating assembly 28 is vacant.

Figure 11:
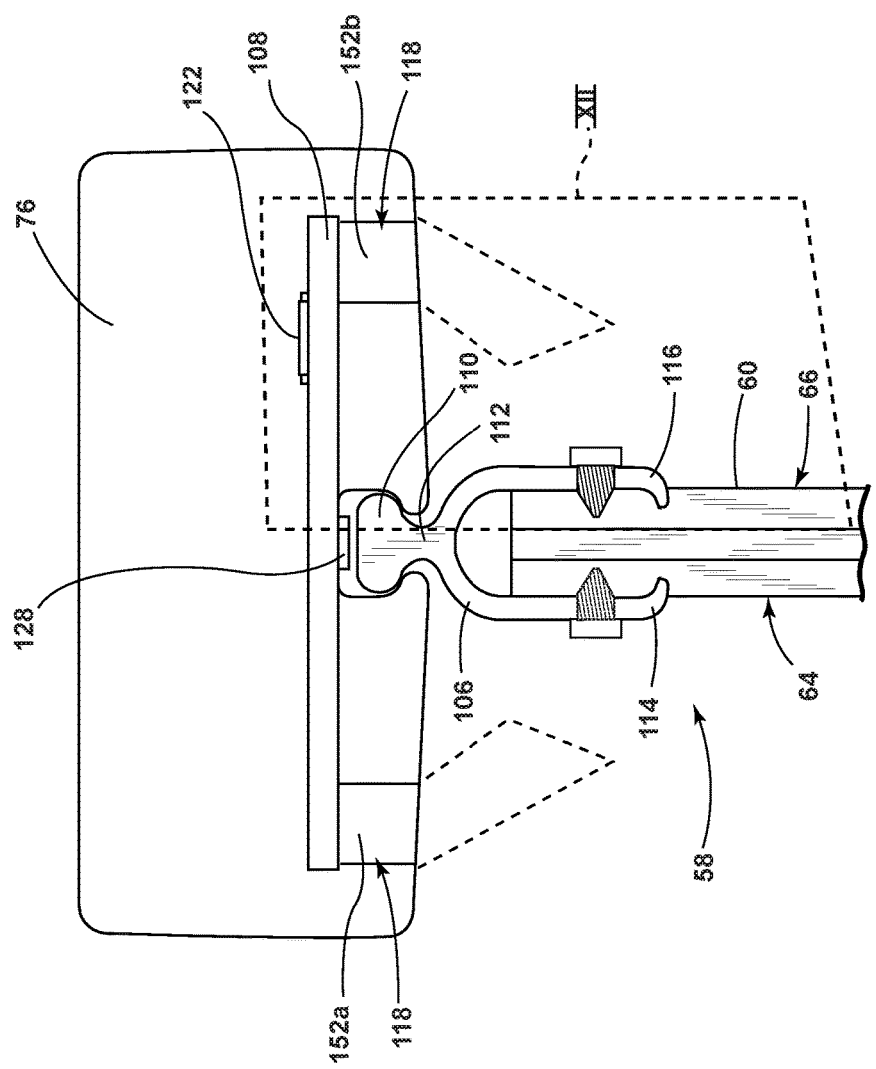
FIG. 11 is a cross-sectional view of the panel and track system taken along the line VIII-VIII of FIG. 3 illustrating the lamp within the track system, according to some examples.
Figure 12:
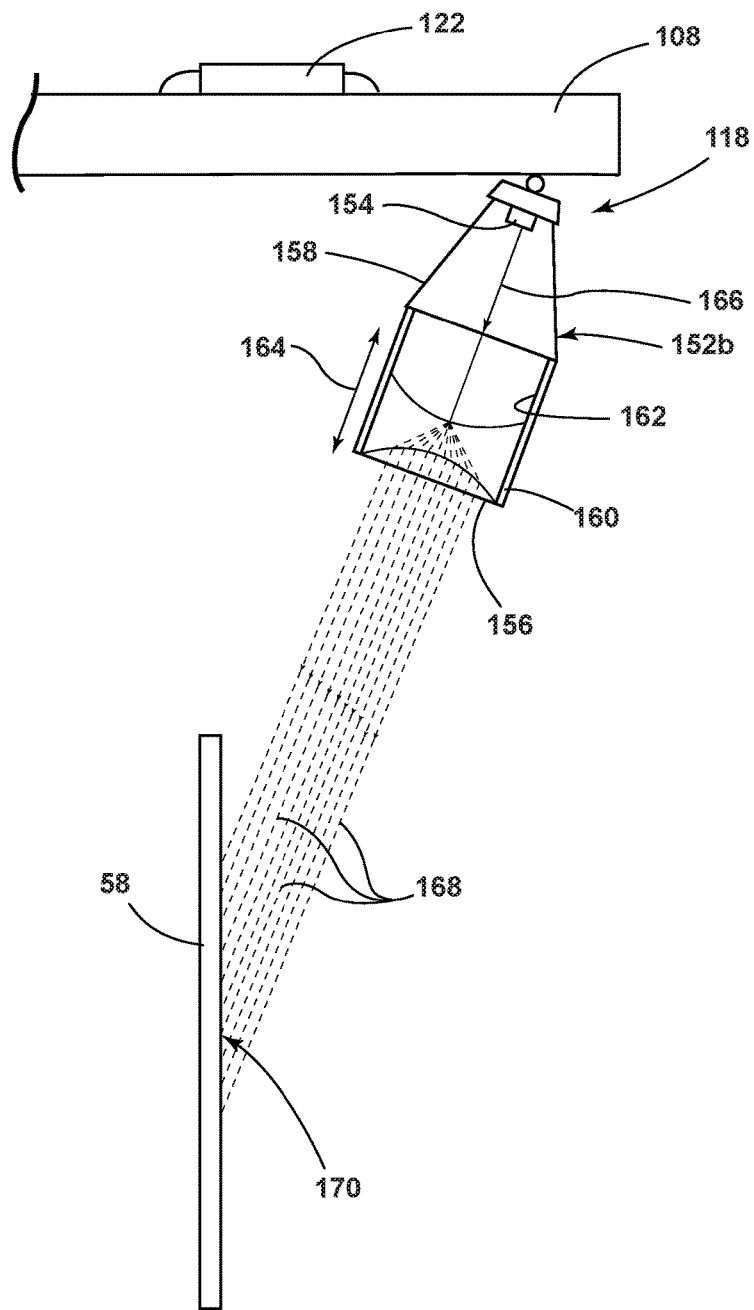
FIG. 12 is an enhanced view of area XII of FIG. 11, according to some examples.
Figure 13:
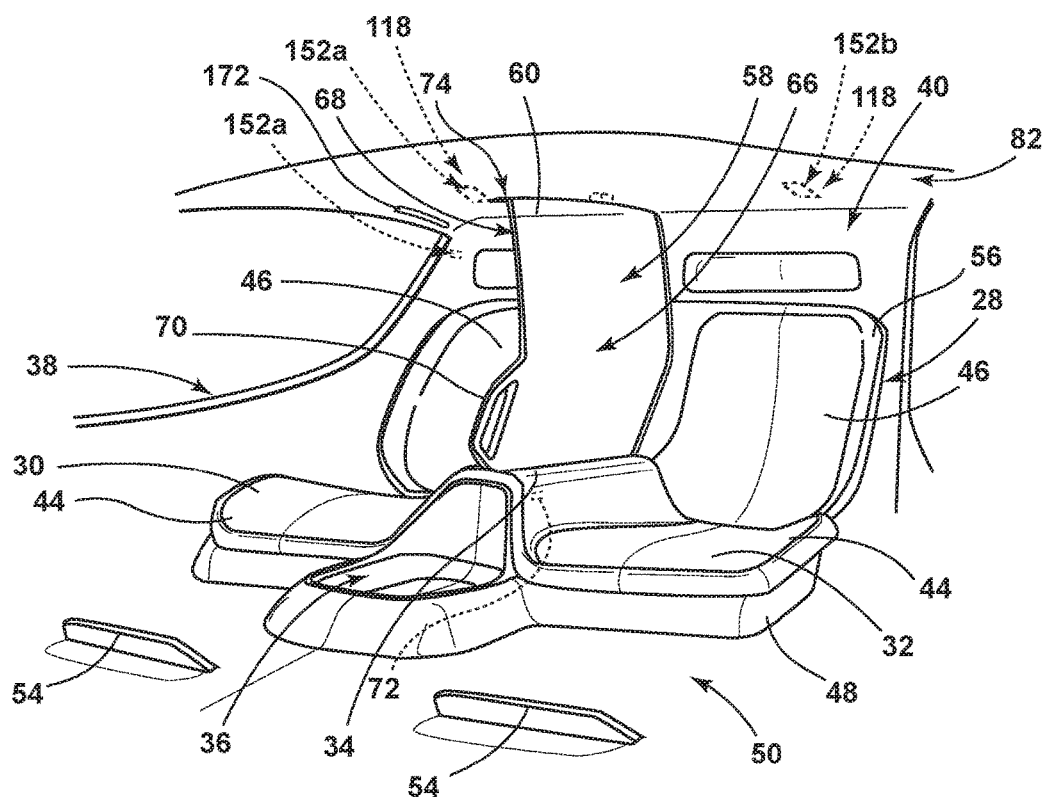
FIG. 13 is a side perspective view of the seating assembly having the lamp disposed within a component of the vehicle, according to some examples.

Referring to FIGS. 11-13, the lamp 118 may be configured as a projector lamp 152. The projector lamp 152 may be disposed within the track system 74 and produce images on the panel 60 when the panel 60 is in the deployed position. In the stowed position, the projector may emit light towards the seating assembly 28 that may be utilized as a lamp 118 within the vehicle 40. Additionally, and/or alternatively, the projector may create a first set of images on the panel 60 when the panel 60 is in the deployed position and may create a second set of images on the seating assembly 28 when the panel 60 is in the stowed position. Each set of images may include messages 131, notifications, alerts, emblems, and/or any other desired indicia. The projector lamp 152 may include a pair of projectors 152a, 152b, disposed on opposing sides of the panel 60.

Referring to FIG. 12, the projector includes a projector light source 154, an optical member 156, a connector casing 158, and an enclosure 160. However, any other type of projector known in the art may be utilized. According to various examples, the projector lamp 152 may include more than one projector light source 154 forming a single light source unit for providing a projection 170 through multiple light beams. In addition, the housing 104 can enable the light source 102 to be replaced by different light sources 120a, 120b having different color characteristics, wavelength, intensity, etc., enabling the possibility of a broad range of variations in projections, eventually aiming to enhance visual appeal to a viewer.

The optical member 156 may be similarly configured to be housed within the enclosure 160, which may be integrally formed with the housing. Further, an inner wall 162 of the enclosure 160 may include tracks or rails over which the optical member 156 can travel back and forth in the direction of the arrow 164 shown in FIG. 12. It is understood that such travel or movability, in relation to the projector light source 154, is configured to vary the size of the projection 170. Particularly, such movability enabled through the tracks or rails allows focusing the projection 170 on the panel 60 as well.

The light beam 166 emitted from the projector light source 154 can be a monochromatic beam of light, such as a laser, and accordingly, the light beam 166 can be a laser beam, configured to deliver a specific wavelength of visible light. This wavelength establishes a laser's color, as seen by the eye, by emitting light in a single, narrow beam. Furthermore, the laser adopted in the projector lamp 152 may be modulated for indoor human viewing and application, particularly having no or negligible effects to those who may view the light. In other embodiments, any other type of light source may be utilized, including red, blue, and green packaged LEDs.

The optical member 156 includes interchangeable lenses, and can accordingly be at least one of a concave lens, convex lens, cylindrical lens, or an impression or projection specific optical member, depending upon the usability and application. Particularly, optical members, such as the optical member 156 may enable one to attain images, messages 131, curves, etc., projected onto a surface, such as the panel 60. In addition, the optical member 156 may include a Fresnel lens composed of a number of small lenses arranged to make a lightweight lens of large diameter and short focal length suitable to be employed for laser projections according to the examples of the present disclosure.

During an operation of the projector lamp 118, the at least one projector light source 154 employed therein emits the light beam 166. The light beam 166 reaches the optical member 156. Subsequently, the optical member 156, receiving the light beam 166, refracts the beam 166, causing the beam to form refracted rays 168, while enabling the beam 166 to travel either in its original direction, or deflect, all based according to the beam's angle of incidence on the optical member 156. The optical member 156 having an impression of at least an image, message, curve, etc., causes the refracted rays 168 to carry the impression towards the panel 60, thereby forming the projection 170. The refracted rays 168, thus formed by the light beam 166 passing across the impression, causes the impression to be projected on the panel 60, allowing the impression specific projection 170 to be visually viewed by a viewer (i.e., occupant). According to some examples, the projector may pivot or have any fixed axis such that the projector may be operably coupled with the panel 60.

Referring to FIG. 13, the projector lamp 152 may be separated from the track system 74 and disposed in any practicable location within the vehicle compartment 38. For example, the projector lamp 152 may be disposed within any trim component of the vehicle 40, such as the headliner 82 and directed towards the panel 60. Additionally, and/or alternatively, the projector lamp 152 may be disposed within a pillar 172 of the vehicle 40 and directed towards the panel 60. As provided herein, the projector lamp 152 may be configured to create an image on a surface 64, 66 (FIG. 11) of the panel 60 when the panel 60 is in the deployed position. The projector lamp 152 may also be configured to produce an image on any other portion of the vehicle compartment 38 when the panel 60 is disposed in the stowed position, or in conjunction with the panel 60 when the panel 60 is in the deployed position.

Figure 14:
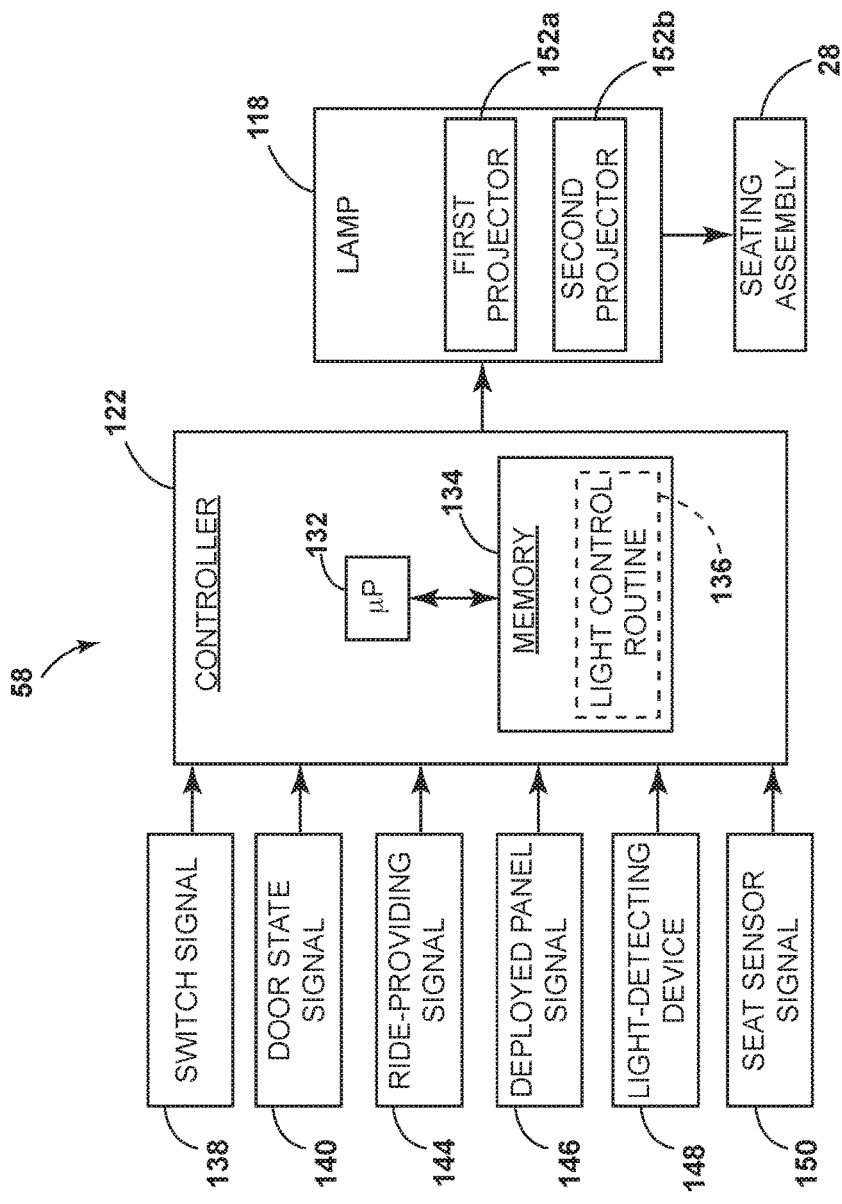
FIG. 14 is a block diagram illustrating controls for activating a lamp including a pair of projectors therein, according to some examples.

Referring to FIG. 14, the partition 58 may include similar components and inputs to those described in reference to FIG. 10. The partition 58 may include the first and second projector lamps 152a, 152b that may create images on opposing sides of the partition 58. Moreover, each projector lamp 152a, 152b may be configured to create an image on any other portion of the seating assembly 28, and/or any other portion of the vehicle compartment 38. The image created by the first or second projector may be determined in response to the signals 138, 140, 144, 146, 148, 150 received.

Figure 15:
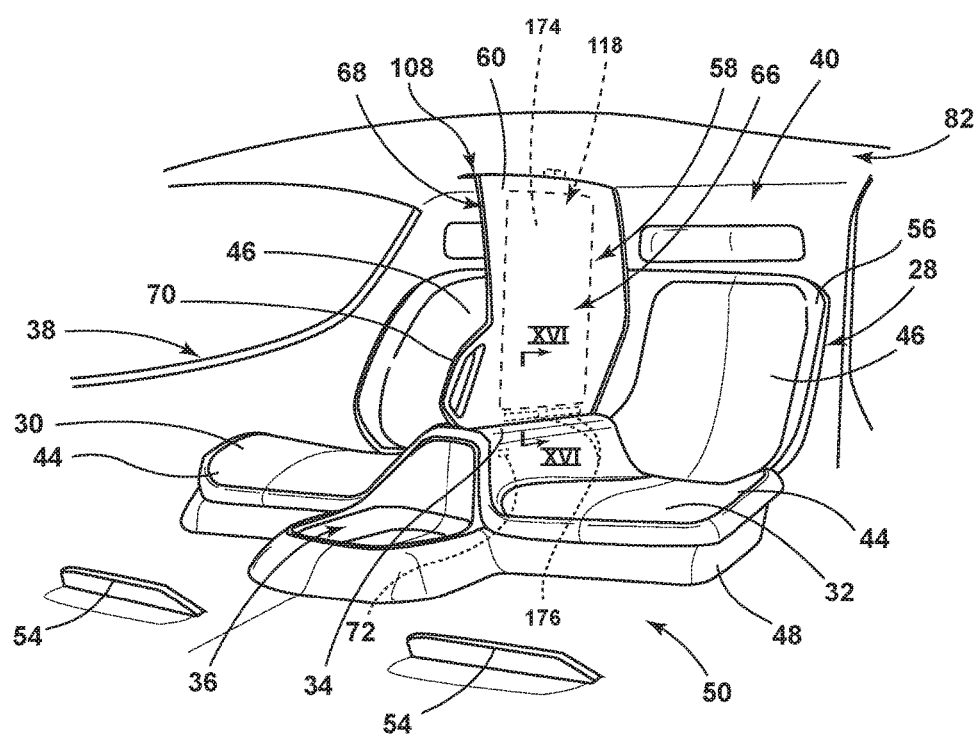
FIG. 15 is a side perspective view of the seating assembly having a lamp that includes a plurality of light sources that form a display on the panel, according to some examples.
Figure 16:
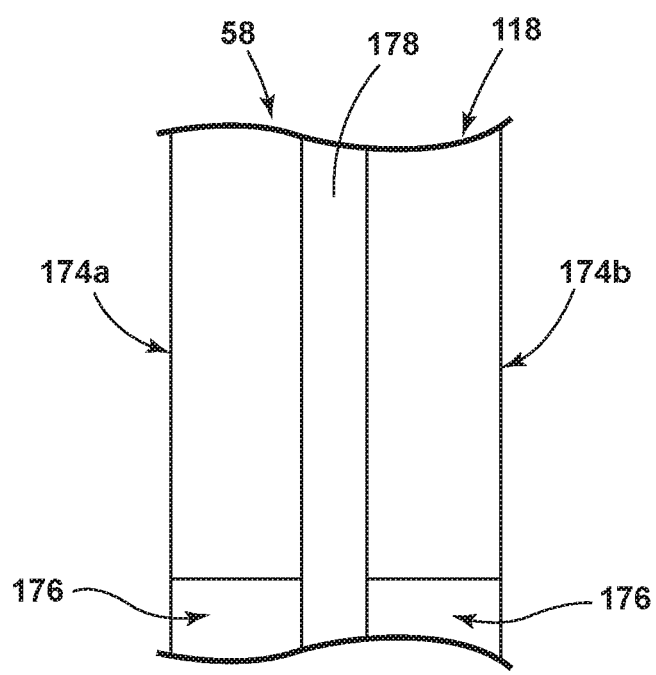
FIG. 16 is a cross-sectional view of the panel taken along the line XVI-XVI of FIG. 15, according to some examples.

Referring to FIGS. 15 and 16, in some examples, the lamp 118 may include a plurality of light sources 120a, 120b that form a display 174 on the panel 60. The display 174 may be disposed on a portion of the partition 58 and include controls 176 for controlling activation of the partition 58 and/or the light sources 120a, 120b that may be used in conjunction with the partition 58. The controls 176 may additionally, and/or alternatively, actuate any number of vehicle features, such as up and down articulation of a window, side view mirror adjustment, door locks, cruise control, volume, trip information, media controls, navigation controls, occupant feature preferences and settings, air conditioning, fan speed, defrost, clock adjustment, etc., between a first state and a second state.

With further reference to FIGS. 15 and 16, the panel 60 may include a first display 174a on a first surface 64 of the panel 60. A second display 174b may be disposed on an opposing surface 66 of the panel 60. A substrate may be disposed between the first and second sides of the panel 60. Likewise, the controls 176 may be operable with and/or formed with the first and/or second display 174a, 174b. The first display 174a, second display 174b, and/or controls 176 may be of the same or different general construction. To that end, one or more of the displays 174a, 174b and/or controls 176 may include an LCD, light emitting diodes (LEDs), and/or organic light emitting diodes (OLEDs), etc. According to some examples, the first display 174a, second display 174b, and/or controls 176 may be a touchscreen display. A touchscreen display may be able to detect pressure, contact, heat, changes in surface electrochemistry of the display, or any other touchscreen methodology as would be known to one of ordinary skill in the art. Also, the touchscreen display may be able to discern two or more contact points at any given time, along with any movement of the two or more contact points simultaneously.

In addition, the first display 174a, the second display 174b, and/or controls 176 may be comprised of more than one smaller display, wherein one or more of the smaller displays may be touchscreen displays. Thus, in one illustrative example, a portion of the first display 174a, second display 174b, and/or controls 176 may comprise a touchscreen while another portion is not a touchscreen. Moreover, one or more smaller displays may combine to form the first display 174a, second display 174b, and/or controls 176, such as a composite display. According to some examples, the first display 174a, the second display 174b, and/or controls 176 may show a virtual keypad on the first display 174a when text is to be entered. In this fashion, a user may touch a representation of a key indicating a letter, symbol, number, etc., to be entered as text.

Accordingly, the partition provided herein may advantageously provide additional information and illumination for passengers of the vehicle. Specific message and alerts may be provided to the occupants of the vehicle based on predefined events. Moreover, the light sources may be automatically activated upon movement of the partition from the stowed position to the deployed position. The partition may be manufactured at low costs and may provide additional features to the vehicle thereby enhancing the perceived value of the vehicle. The partition may also provide additional privacy to occupants of the vehicle.

According to various examples, a seating assembly is provided herein. The seating assembly includes a partition disposed between first and second seats. The partition includes a panel that is movable between a stowed position and a deployed position along a track assembly. A first lamp is configured to project a first image onto the panel. The seating assembly may be configured as a vehicle seating assembly. Examples of the seating assembly can include any one or a combination of the following features:

the first lamp comprises a projector light source; an optical member optically coupled with the projector light source; a connector casing; and an enclosure;

the first lamp creates a first set of images on the panel when the panel is in the deployed position and may create a second set of images on the seating assembly when the panel is in the stowed position;

the images include notifications for an occupant of a vehicle;

the first lamp is disposed within the track assembly;

the first lamp is disposed within a trim component of a vehicle;

a second lamp configured to project a second image onto the panel;

the first and second sets of images are projected on opposing surfaces of the panel;

the first image is illuminated by a light source based on a door sensor signal, wherein the light source is activated when an occupant enters a vehicle;

the track assembly includes a position sensor and the first lamp is activated when the position sensor detects the panel is in the deployed position;

the first lamp includes a plurality of light sources that form a display on the panel, the display configured to provide information for an occupant of the vehicle; and/or the first lamp is configured to produce images on the panel when the panel is in the deployed position.

According to some examples, a seating assembly is provided herein. The seating assembly includes a movable partition disposed between first and second seats. The movable partition includes a panel. A projector lamp is operably coupled with the panel. The projector lamp creates a first image as an occupant enters a vehicle and a second image as the occupant exits the vehicle. Examples of the seating assembly can include any one or a combination of the following features:

a housing, wherein the panel is disposed within a cavity defined by the housing when the panel is in a stowed position; and/or a track assembly operably coupled with the panel and configured to direct movement of the panel between the stowed and deployed positions.

According to some examples, a seating assembly is provided herein. The seating assembly includes a partition disposed between first and second seats. The partition includes a panel that is movable between a stowed position and a deployed position. First and second bins are respectively disposed proximate the first and second seats. A housing separates the first and second bins. A lamp is configured to create an image on the panel. Examples of the seating assembly can include any one or a combination of the following features:

the image is projected onto the panel;

the image is provided by a display;

the image provides a plurality of indicia for an occupant of the vehicle; and/or two opposing sides of the panel have two different images simultaneously projected thereon.

Moreover, a method of illuminating a seating assembly is provided herein. The method includes partitioning first and second seats with a panel that is movable between a stowed position and a deployed position along a track assembly. A first image is projected onto the panel.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seating assembly comprising:
   a partition disposed between first and second seats arranged in a vehicle side-to-side orientation, the partition positioned in a fore-aft direction and including a panel movable between a vehicle rearward stowed position and a vehicle forward deployed position along a track assembly; and
   a first lamp configured to project a first image onto the panel, wherein the first lamp is disposed between the panel and a vehicle side door.

2. The seating assembly of claim 1, wherein the first lamp is a projector lamp that is configured to produce images on the panel when the panel is in the deployed position.

3. The seating assembly of claim 2, wherein the first lamp comprises:
   a projector light source;
   an optical member optically coupled with the projector light source;
   a connector casing; and
   an enclosure.

4. The seating assembly of claim 1, wherein the first lamp creates a first set of images on the panel when the panel is in the deployed position and creates a second set of images on the seating assembly when the panel is in the stowed position.

5. The seating assembly of claim 4, wherein the images include notifications for an occupant of a vehicle.

6. The seating assembly of claim 1, wherein the first lamp is disposed within the track assembly.

7. The seating assembly of claim 1, wherein the first lamp is disposed within a trim component of a vehicle.

8. The seating assembly of claim 7, further comprising:
   a second lamp configured to project a second image onto the panel.

9. The seating assembly of claim 8, wherein the first and second images are projected on opposing surfaces of the panel.

10. The seating assembly of claim 1, wherein the first image is illuminated by a light source based on a door sensor signal and the light source is activated when an occupant enters a vehicle.

11. The seating assembly of claim 10, wherein the track assembly includes a position sensor and the first lamp is activated when the position sensor detects the panel is in the deployed position.

12. The seating assembly of claim 1, wherein the first lamp includes a plurality of light sources that form a display on the panel, the display configured to provide information for an occupant of the vehicle.

13. A seating assembly comprising:
   a movable partition disposed between first and second seats, the movable partition including a panel;
   a track system, including a first and second rail, wherein the panel is configured to move along the track system; and
   a projector lamp operably coupled with the panel, wherein the projector lamp creates a first image as an occupant enters a vehicle and a second image as the occupant exits the vehicle.

14. The seating assembly of claim 13, further comprising:
   a housing, wherein the panel is disposed within a cavity defined by the housing when the panel is in a stowed position.

15. The seating assembly of claim 13, wherein the track system is oriented in a fore-aft direction.

16. A seating assembly comprising:
   a partition disposed between first and second seats, the partition including a panel;
   a track system operably coupled with the panel, the panel configured to move along the track system between a stowed position and a deployed position;
   first and second bins respectively disposed proximate the first and second seats, wherein a housing separates the first and second bins; and
   a lamp configured to create an image on the panel, wherein the lamp is disposed between the panel and a vehicle side door.

17. The seating assembly of claim 16, wherein the image is projected onto the panel.

18. The seating assembly of claim 16, wherein the image is provided by a display.

19. The seating assembly of claim 18, wherein the image provides a plurality of indicia for an occupant of the vehicle.

20. The seating assembly of claim 18, wherein two opposing sides of the panel have two different images simultaneously projected thereon.

* * * * *